Patented Nov. 5, 1929

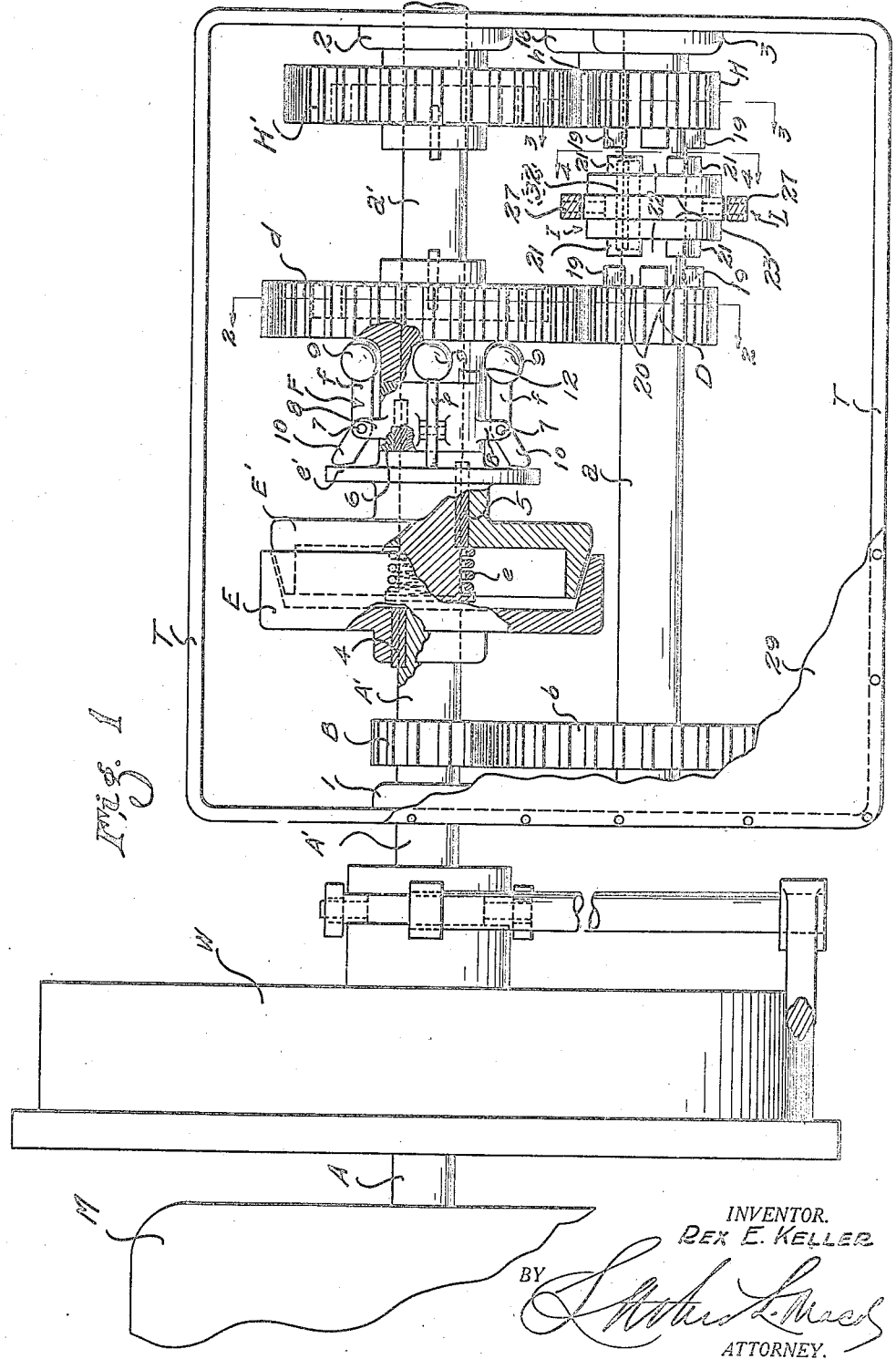

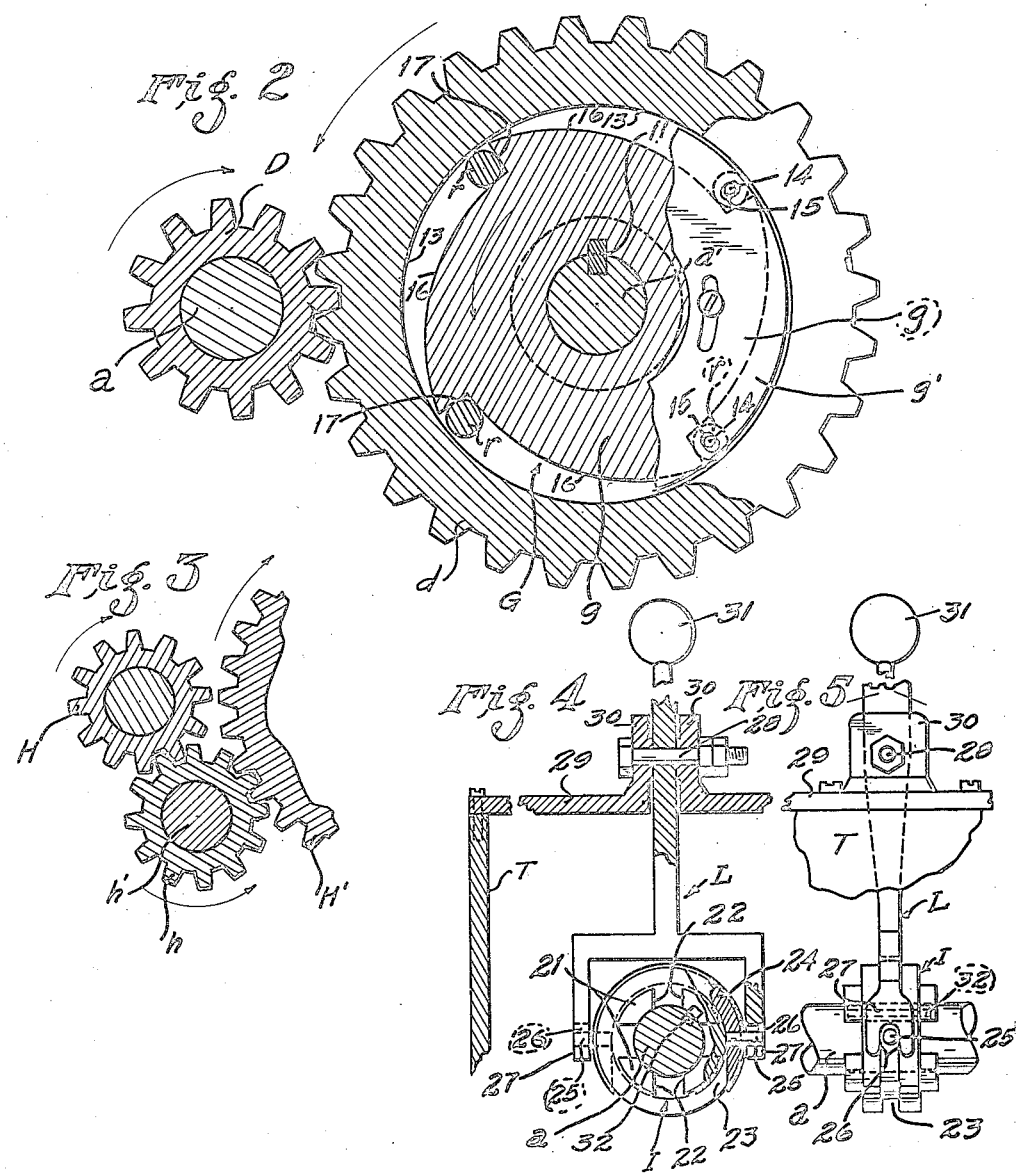

1,734,491

UNITED STATES PATENT OFFICE

REX E. KELLER, OF LOS ANGELES, CALIFORNIA

TRANSMISSION

Application filed May 25, 1927. Serial No. 194,207.

This invention relates to transmissions of the character applied to motor vehicles, and the primary object is to provide a simple, efficient and practical transmission mechanism arranged to automatically effect changes in the speed and power ratios, thus eliminating the usual gear shifting mechanism.

Another object is to provide a mechanism for the purpose stated which, instead of encumbering the transmission of a motor vehicle with many additional parts and complicated devices, will in fact provide a mechanism of substantially simpler character than the ordinary mechanism now in use on such vehicles, and which will yet provide for the automatic shifting of the gears for the different speeds.

Other objects will appear as the description progresses.

I have shown a preferred form of device in the accompanying drawings, subject to modification within the scope of the appended claims, without departing from the spirit of my invention.

In said drawings:

Fig. 1 is a sectional plan of a transmission mechanism embodying my improvements and arranged for connection with a motor of a vehicle;

Fig. 2 is a transverse section of the same on line 2—2 of Fig. 1;

Fig. 3 is a fragmentary section of the same on line 3—3 of Fig. 1;

Fig. 4 is a transverse section of the same on line 4—4 of Fig. 1; and

Fig. 5 is a side elevation of the gear shifting device necessary for reversing the operation of the driven shaft.

In Fig. 1 M represents a motor such as is generally used on motor propelled vehicles and W is a fly wheel and clutch unit for connecting the crank shaft A of the motor with the usual transmission shaft $A'$ which extends into the transmission case T and is journaled in a bearing 1 at the forward end thereof. Alined with the shaft $A'$ I provide a driven shaft $a'$ corresponding to the usual propeller shaft of an automobile, which is journaled at a plurality of points in the case T, as at 2.

Paralleling the shafts $A'$ and $a'$, I provide a counter shaft $a$ journaled in bearings, as at 3 in the ends of the transmission case T. Shaft $a$ is positively driven by shaft $A'$ through the medium of gears B and $b$ fixed to said shafts respectively, at points near the forward end of the case T. Shafts $a$ and $a'$ are also connected, but differentially so, by means of gears D and $d$, the gear D being loosely mounted on shaft $a$ while the gear $d$ is clutch connected with its shaft $a'$, as hereinafter described. At this point it may be noted that the ratio of the gears B—$b$ and D—$d$ are such that a substantial reduction in speed and a corresponding increase in power will be transmitted to the driven shaft $a'$. Furthermore there may be two or more sets of the gears D—$d$ provided on and similarly connected with the shafts $a$ and $a'$, with different power and speed ratio, for varying the application of power to the driven shaft, as in the case of other transmission mechanisms.

The gear train composed of the gears B, $b$, D and $d$ correspond to what is generally termed "low gear" or ordinary transmissions. On the adjacent ends of shafts $A'$ and $a'$, I provide a suitable form of clutch device of the cone or plate types, as may be found to be most suitable, as at E and $E'$. Said members are normally held in inoperative positions by means of a usual form of coil spring $e$ carried internally of the members E and $E'$ and held in compression therebetween. Members E and $E'$ are fixed to and for rotation with the shafts $A'$ and $a'$, respectively, by means of keys 4 and 5, and the member $E'$ has a rearwardly extending hub 6 provided with a disc $e'$. A governor F is mounted on the hub 6 rearwardly of the disc $e'$ and is composed of a plurality of levers $f, f$, etc.; which are pivotally held at points 7, 7, etc., on lugs 8, 8, etc., extending from the peripheries of the hub 6.

Levers $f, f$ etc., have weights 9, 9, etc., formed on or attached to their free ends and the opposite extremities 10, 10, etc., are disposed at angles with respect to the weighted portions and are adapted to frictionally engage the rear side of disc $e'$. Thus, as driven shaft is rotated the weights 9, 9, etc., will be thrown outwardly from their normal positions, shown in Fig. 1, by centrifugal force and the portions 10, 10, etc., of the levers f, f, etc., will force the clutch member E' inwardly into engagement with the member E, against the tension of spring e, when said shaft attains a predetermined speed. Shaft a' is thus adapted to be positively driven by the train of gears B, b, D and d until the clutch E—E' becomes effective for communicating power directly to the shaft a', as hereinafter explained.

By referring to Fig. 2, it will be observed that the gear d is differentially connected with shaft a' by means of an internal roller clutch G including an internal member of disc like form, as at g, which is fixed to the shaft a' by means of a key 11, or otherwise, a plurality of rollers r, r, etc., operating thereover, and a roller supporting disc g' externally of member g. Gear d is loosely mounted on shaft a' at its hub 12 and is provided with a bored recess 13 for operably holding the members g and g', and rollers r, r, etc.

One of the members g' may be provided on each side of the member g and the rollers r, r, etc., are adapted to be adjustably carried thereon by means of trunnions 14 extending from the ends of the rollers into radially elongated slots 15 formed in the members g'. Member g is peripherally formed with a plurality of inclined or eccentric portions 16, 16, etc., with radially formed shoulders 17, 17, etc., at the ends thereof, on which the rollers r, r, etc., are held.

The portions 16, 16, etc., are so formed and arranged that when power is applied to the gear d the rollers r, will grip the inner periphery 16 of said gear and the portions 16 of the member g and cause the rotation of shaft a' in a direction corresponding to that of the shafts A and A'. When shaft a', however, rotates at a speed sufficient to effect the engagement of the clutch E—E' and faster than gear d, power will be applied directly from shaft A' to shaft a' and the rollers r will disengage the gear d automatically, through the operation of the governor F.

Shaft a' is additionally connected with shaft a by means of a train of gears H, h and H', gears H and H' being carried on shafts a and a', respectively, while gear h is mounted on a stud shaft h' held in a boss 18 of the case T. Gear H is loose on shaft a and gear H' is reversely connected with shaft a' when considered with respect to gear d. Thus a reverse motion is communicated to shaft a' for applying power to said shaft when the vehicle is in reverse gear.

Gears d and H' are substantially similar in all respects except for their reverse connection with shaft a' and one of the clutches G is employed in the gear H'. The counter-shaft a carries a jaw clutch I slidably thereon for selective engagement with the gears D and H, and normally occupying a position intermediate and disengaged from said gears, so that when the vehicle is stationary and the clutch I is in neutral position, no power will be communicated to the shaft a'.

Adjacent sides of gears D and H are provided with a plurality of alternating jaws 19, 19, etc., and recesses 20, 20, etc., adapted to mesh with correspondingly formed and spaced jaws 21, 21, etc., and recesses 22, 22, etc., said jaws being formed on both sides of the clutch member I. Member I has a centrally formed annular groove 23 adapted to receive a semi-annular member 24 carrying trunnions 25, 25 which are adapted to engage slots 26, 26 in the bifurcated ends 27, 27, of a shift lever L which is pivotally mounted at 28 on the top 29 of the case T between lugs 30, 30 and has an operating knob 31 at the upper end thereof.

Member I is alined or keyed, as at 32, to the counter-shaft a, and is accordingly positively driven by means of the gears B and b and shaft a, and said member is necessary for disconnecting the shaft a' while the motor is idling and the vehicle is stationary.

In operation, when the motor M is operative, shaft A', gears B and b, shaft a and clutch I will be operative, but the gears D, d, H, h and H' will remain inoperative so long as the clutch I is disengaged and in neutral position. Likewise the clutch member E' will be normally disengaged from the member E by means of the tension of spring e. When it is desired to impart forward movement to the vehicle the lever L is shifted rearwardly so as to engage the clutch I with gear D for communicating power to shaft a through the medium of gears D and d. In such case the clutch G becomes operative for applying the power in a forward direction to shaft a', and governor F and clutch member E' rotate with said shaft. When a predetermined speed is attained the governor F will be automatically operative for engaging clutch members E and E' and will thus direct connect the shafts A and a' and said shaft a' will rotate faster than the gear d, thus disengaging the clutch G therefrom. Such action will gear the mechanism in "high", whereas while the gears D and d were operative for driving shaft a' said mechanism was geared in "low".

Whenever the speed of shaft a' decreases sufficiently to actuate the governor F for disengaging the clutch E—E' the power will be automatically applied through gears D and d, as before. To reverse the gearing the lever L is moved forwardly for disengaging the clutch I from gear D and for engaging the same with gear H. Thus power is applied to shaft a' through the medium of gears H, h and H', and the clutch I in gear H' operated to connect shaft a' so long as clutch I is engaged with gear H. It will be observed that during the movement of the vehicle the gears are automatically shifted from a low to a high gear ratio and the operation of lever L and clutch I is necessary only for reversing the movement of the vehicle, for gearing the transmission in neutral, as when the vehicle is stationary, or for starting the movement of the vehicle from a stationary position.

One or more additional forward gear trains similar to the gears B—b may be employed for connecting the shafts a and a', and the mechanism may be arranged for rendering said additional gears operative or inoperative by the employment of additional clutches E—E', or by employing a single clutch for the several trains, this not being material to my invention. Likewise the means herein shown and described may be employed in connection with commonly used types of transmission devices by the addition of improvements thereto, as will readily appear to those skilled in the art.

What I claim is:

1. A transmission mechanism comprising a drive shaft, a driven shaft, a clutch constructed with one member fixed on said drive shaft and its other member slidably mounted on said driven shaft, a counter shaft, a pinion fixed on said drive shaft, a gear fixed on said counter shaft in mesh with said pinion, a pinion loosely mounted on said counter shaft, a clutch slidable on and fixed to the counter shaft for operably connecting said loosely mounted pinion to and for rotation with said counter shaft, a gear loosely mounted on said driven shaft in mesh with said loosely mounted pinion, means for automatically clutching said loosely mounted gear to said driven shaft when said driven shaft is driven through said loosely mounted pinion and loosely mounted gear, a governor on said driven shaft, a means actuated by said governor for urging said slidable clutch member into engagement with said fixed clutch member for causing said drive shaft to drive said driven shaft directly when said driven shaft is driven a predetermined speed through said loosely mounted pinion, gear and automatic gear clutching means, and said automatic clutching means being constructed and arranged to release the loosely mounted gear from the driven shaft when the driven shaft is clutched to and driven by said drive shaft.

2. A transmission mechanism comprising a drive shaft, a driven shaft, a clutch constructed with one member fixed on said drive shaft and its other member slidably mounted on said driven shaft, a counter shaft, a pinion fixed on said drive shaft, a gear fixed on said counter shaft in mesh with said pinion, a pinion loosely mounted on said counter shaft, a low gear loosely mounted on said driven shaft in mesh with said loosely mounted pinion, a second pinion loosely mounted on said counter shaft, a reverse gear loosely mounted on said driven shaft, an idler pinion in mesh with said second loosely mounted pinion and said reverse gear, means for clutching either said first or said second loosely mounted pinion to said counter shaft, automatic clutching means for clutching said low gear to said driven shaft when said shaft is driven through said low gear and meshing pinion, automatic clutching means for clutching said reverse gear to said driven shaft when said shaft is driven through said reverse gear, idler pinion and second loosely mounted pinion, a governor on said driven shaft, means actuated by said governor for urging said slidable clutch member into engagement with said fixed clutch member for causing said drive shaft to drive said driven shaft directly when said driven shaft is driven to a predetermined speed through said low gear and its automatic clutching means, and both of said automatic clutching means being constructed and arranged to release said driven shaft and said low gear or said reverse gear, when said driven shaft is clutched to and driven by said drive shaft.

3. A transmission mechanism comprising a drive shaft, a driven shaft, a counter shaft, a pinion fixed on said drive shaft, a gear fixed on said counter shaft in mesh with said pinion, a low gear pinion loosely mounted on said counter shaft, a clutch for clutching said low gear pinion to said counter shaft, a low gear loosely mounted on said driven shaft in mesh with said low gear pinion, means for automatically clutching said low gear to said driven shaft when said driven shaft is driven through said counter shaft and low gear pinion, a reverse gear pinion loosely mounted on said counter shaft, and positioned to be clutched by said clutch to said counter shaft, a reverse gear loosely mounted on said driven shaft, an idler pinion in mesh with said low gear pinion and said reverse gear, means for automatically clutching said reverse gear to said driven shaft when said driven shaft is driven reversely through said counter shaft, reverse pinion, idler and reverse gear, and means for automatically clutching said driven shaft to said drive shaft when the driven shaft is driven to a predetermined degree through said low gear pinion and low gear and its automatic clutching means, said low gear automatic clutching means being constructed and arranged to release said driven shaft when said driven shaft is clutched to said drive shaft.

4. A transmission mechanism comprising axially alined driving and driven shafts, a clutch constructed with one member fixed to the drive shaft and its other member slidable on the driven shaft, a governor on and rotatable with the driven shaft for regulating the operation of said clutch, a counter shaft, permanently meshing gears connecting the drive shaft with the counter shaft, a loose gear on the counter shaft, a gear on the driven shaft meshing with said loose gear, and connected for rotation with the driven member of said clutch, and means on the counter shaft operable at will for connecting said loose gear with the counter shaft for imparting indirect motion from the driving shaft to the driven shaft, said clutch serving to impart direct motion from the driving shaft to the driven shaft when said loose gear is disconnected from the counter shaft.

5. A transmission mechanism as defined in claim 4, including a second loose gear on the counter shaft, a second gear on the driven shaft and an idler gear connecting said second set of gears, said second loose gear adapted to be operably connected with the counter shaft for transmitting reverse motion to the driven shaft.

6. A transmission mechanism comprising axially alined driving and driven shafts, a direct drive clutch constructed with one member fixed to the drive shaft and its other member fixed to and slidable on the driven shaft, a speed operated governor fixed to the driven shaft and operably connected with and for rendering said clutch operative at a predetermined speed for directly driving the driven shaft from the driving shaft, a counter-shaft, permanently meshing gears fixed respectively to the driving shaft and the counter-shaft for continuously rotating the counter-shaft, a pair of loose gears spaced apart on the counter-shaft, forward and reverse gears on the driven shaft permanently meshing with said loose gears, devices for connecting said pair of gears to the driven shaft whereby said gears will effect the rotation of the driven shaft in opposite directions, and means slidable on the counter-shaft for selective engagement with said loose gears for imparting forward and reverse motion respectively to the gears on said counter-shaft.

7. A transmission mechanism as characterized in claim 6, and means associated with said clutch for normally holding the clutch members disengaged while the driven shaft is indirectly operated through the counter-shaft gears and prior to the operation of said governor for engaging the clutch member.

REX E. KELLER.